United States Patent
Earnest (12)

(10) Patent No.: US 12,433,507 B2
(45) Date of Patent: Oct. 7, 2025

(54) HEIGHT-MEASURING BED SHEET

(71) Applicant: Lewis Dabbs Earnest, Athens, GA (US)

(72) Inventor: Lewis Dabbs Earnest, Athens, GA (US)

(*) Notice: Subject to any disclaimer, the term of this patent is extended or adjusted under 35 U.S.C. 154(b) by 308 days.

(21) Appl. No.: 18/128,019

(22) Filed: Mar. 29, 2023

(65) Prior Publication Data
US 2024/0324900 A1    Oct. 3, 2024

(51) Int. Cl.
*A61B 5/107*      (2006.01)
*A61G 7/05*       (2006.01)

(52) U.S. Cl.
CPC .............. *A61B 5/1072* (2013.01); *A61G 7/05* (2013.01)

(58) Field of Classification Search
CPC ...................................................... A61B 5/1072
USPC ................ 33/1 B, 1 G, 494, 512, 563, 679.1
See application file for complete search history.

(56) References Cited

U.S. PATENT DOCUMENTS

| | | | | |
|---|---|---|---|---|
| 3,137,943 A | * | 6/1964 | Mechaneck .......... | A61B 5/1072 D10/70 |
| 4,713,888 A | * | 12/1987 | Broselow .............. | A61B 10/00 33/759 |
| 4,823,476 A | * | 4/1989 | Curtin ..................... | A41H 1/02 33/1 K |
| 4,827,621 A | * | 5/1989 | Borsuk .............. | A47G 27/0487 33/1 G |
| 5,012,590 A | * | 5/1991 | Wagner ............... | E04G 21/1891 33/759 |
| 5,335,421 A | * | 8/1994 | Jones, Jr. .............. | G01B 3/004 33/759 |
| 5,588,215 A | * | 12/1996 | Hart ........................ | G01B 3/02 33/759 |

(Continued)

FOREIGN PATENT DOCUMENTS

| | | |
|---|---|---|
| CN | 211244214 U | 8/2020 |
| CN | 110547925 B | 5/2021 |

(Continued)

OTHER PUBLICATIONS

ODDITYMALL; Article entitled: "These Baby Bed Sheets Keep Track of Their Height as They Grow", located at <https://odditymall.com/baby-measuring-bed sheets>, published Aug. 6, 2015, 4 pgs.

(Continued)

*Primary Examiner* — George B Bennett
(74) *Attorney, Agent, or Firm* — Buchalter, a Professional Corporation

(57) ABSTRACT

A height-measuring bed sheet includes a top sheet panel defining a height-indicative pattern, the height-indicative pattern comprising height measurement indicia forming a design, wherein the height-measuring bed sheet is configured to cover a mattress of a bed, the top sheet panel is configured to confront a mattress top of the mattress, and the height-indicative pattern forms a height measurement scale for measuring a height of a patient in the bed; a pair of opposing side sheet panels extending from the top sheet panel, the pair of opposing side sheet panels configured to confront opposing mattress sides of the mattress; and a pair of opposing end sheet panels extending from the top sheet panel, the end sheet panels configured to confront opposing mattress ends of the mattress.

21 Claims, 8 Drawing Sheets

(56) References Cited

U.S. PATENT DOCUMENTS

| | | | | |
|---|---|---|---|---|
| 5,669,077 | A * | 9/1997 | Stewart | A61B 5/1072 2/269 |
| 7,340,842 | B2 | 3/2008 | Rabe | |
| 7,475,487 | B1 * | 1/2009 | Johnson | G01B 5/02 33/832 |
| 7,854,073 | B1 * | 12/2010 | Webb | D05B 97/12 33/1 G |
| 8,151,478 | B2 | 4/2012 | Kenney | |
| 8,186,072 | B1 * | 5/2012 | Nethery | D05B 97/12 33/565 |
| 8,539,690 | B2 * | 9/2013 | Haykeen | A61B 5/1072 600/587 |
| 8,845,332 | B1 * | 9/2014 | Reid | A61B 5/1072 702/173 |
| 8,887,402 | B2 * | 11/2014 | Doppel | A61B 5/1072 33/2 A |
| 9,351,666 | B2 * | 5/2016 | Wojcieszak | A43D 1/02 |
| 10,314,996 | B2 * | 6/2019 | Tang Ee Ho | A61B 5/1072 |
| 11,382,532 | B1 * | 7/2022 | Hajianpour | G01B 5/061 |
| 2005/0204471 | A1 | 9/2005 | Ruiz | |
| 2005/0210694 | A1 * | 9/2005 | Leyden | A61B 5/1072 33/492 |
| 2007/0234476 | A1 | 10/2007 | Cerbelli et al. | |
| 2007/0240326 | A1 | 10/2007 | Cerbelli et al. | |
| 2009/0158602 | A1 * | 6/2009 | Lockyer | B43L 7/005 33/562 |
| 2012/0030958 | A1 | 2/2012 | Mihalcik | |
| 2014/0202017 | A1 * | 7/2014 | Wood | G01B 3/20 33/512 |
| 2018/0286071 | A1 * | 10/2018 | Alexander | G06T 7/62 |
| 2021/0085033 | A1 * | 3/2021 | Keyes | A43D 1/025 |
| 2021/0307647 | A1 | 10/2021 | Kahn et al. | |

FOREIGN PATENT DOCUMENTS

| | | |
|---|---|---|
| CN | 113855000 A | 12/2021 |
| TW | M574452 U | 2/2019 |
| WO | 2019180573 | 9/2019 |

OTHER PUBLICATIONS

Radhika, Seth; Article entitled: "Measuring Babies", Yanko Design, located at <https://www.yankodesign.com/author/radhika-seth/>, published Dec. 17, 2009, 6 pgs.

Technical Textile; Article entitled: "Nanit unveils smart sheets to measure baby's height", located at <https://www.technicaltextile.net/news/nanit-unveils-smart-sheets-to-measure-baby-s-height-272250.html >, published Feb. 8, 2021, 5 pgs.

* cited by examiner

| IDEAL BODY WEIGHT ||||||
| FOR MALE ||| FOR FEMALE |||
| Height | weight || Height | weight ||
| | Pounds | Kilos | | Pounds | Kilos |
|---|---|---|---|---|---|
| 5' 0" | 106 | 48.1 | 4' 8" | 80 | 36.3 |
| 5' 1" | 112 | 50.8 | 4' 9" | 85 | 38.5 |
| 5' 2" | 118 | 53.5 | 4' 10" | 90 | 40.8 |
| 5' 3" | 124 | 56.2 | 4' 11" | 95 | 43.1 |
| 5' 4" | 130 | 59.0 | 5' 0" | 100 | 45.3 |
| 5' 5" | 136 | 61.7 | 5' 1" | 105 | 47.6 |
| 5' 6" | 142 | 64.4 | 5' 2" | 110 | 49.9 |
| 5' 7" | 148 | 67.1 | 5' 3" | 115 | 52.2 |
| 5' 8" | 154 | 69.8 | 5' 4" | 120 | 54.4 |
| 5' 9" | 160 | 72.6 | 5' 5" | 125 | 56.7 |
| 5' 10" | 166 | 75.2 | 5' 6" | 130 | 59.0 |
| 5' 11" | 172 | 78.0 | 5' 7" | 135 | 61.2 |
| 6' 0" | 178 | 80.7 | 5' 8" | 140 | 63.5 |
| 6' 1" | 184 | 83.5 | 5' 9" | 145 | 65.8 |
| 6' 2" | 190 | 86.2 | 5' 10" | 150 | 68.0 |
| 6' 3" | 196 | 88.9 | 5' 11" | 155 | 70.3 |

FIG. 6

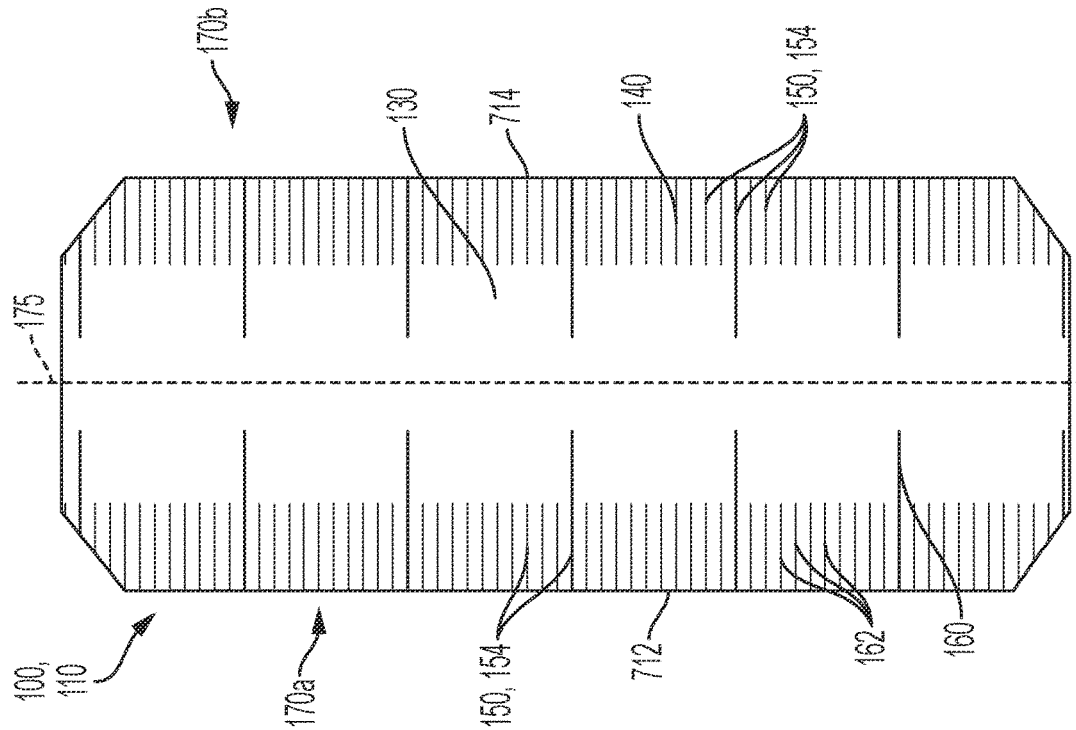
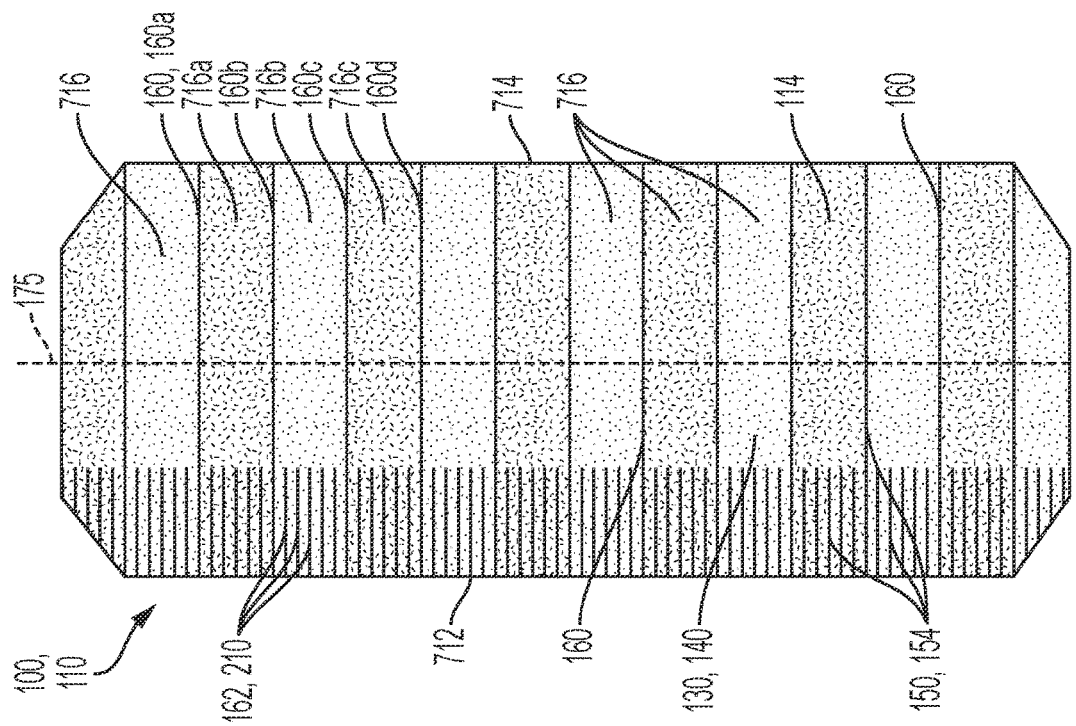

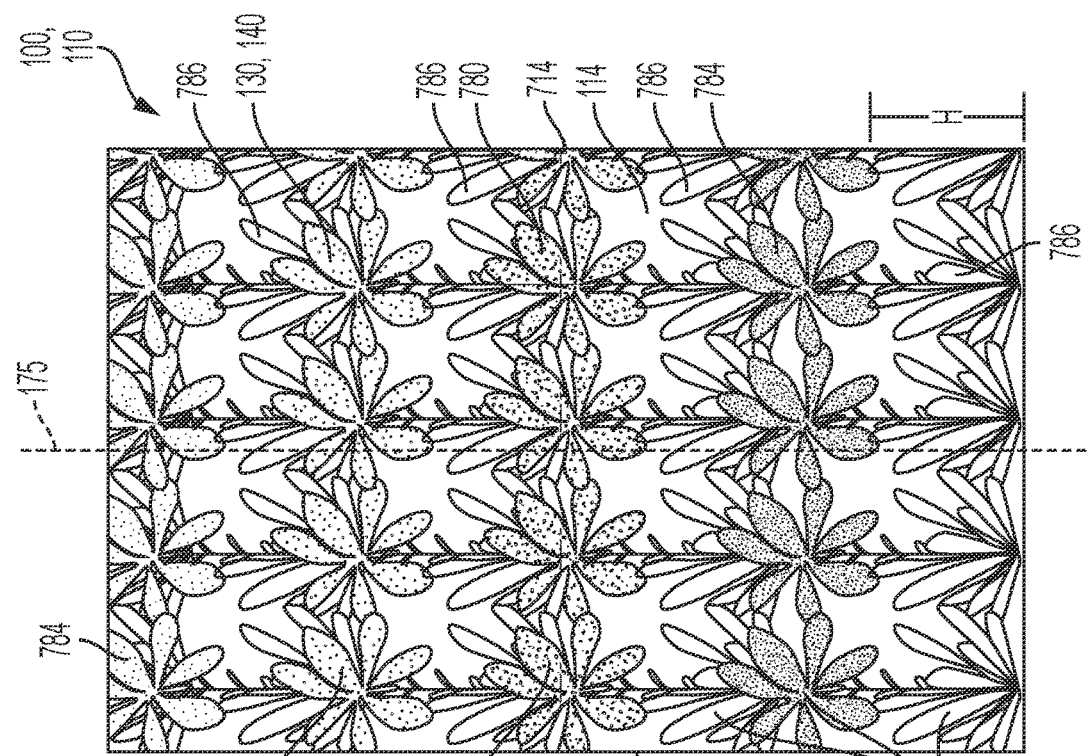
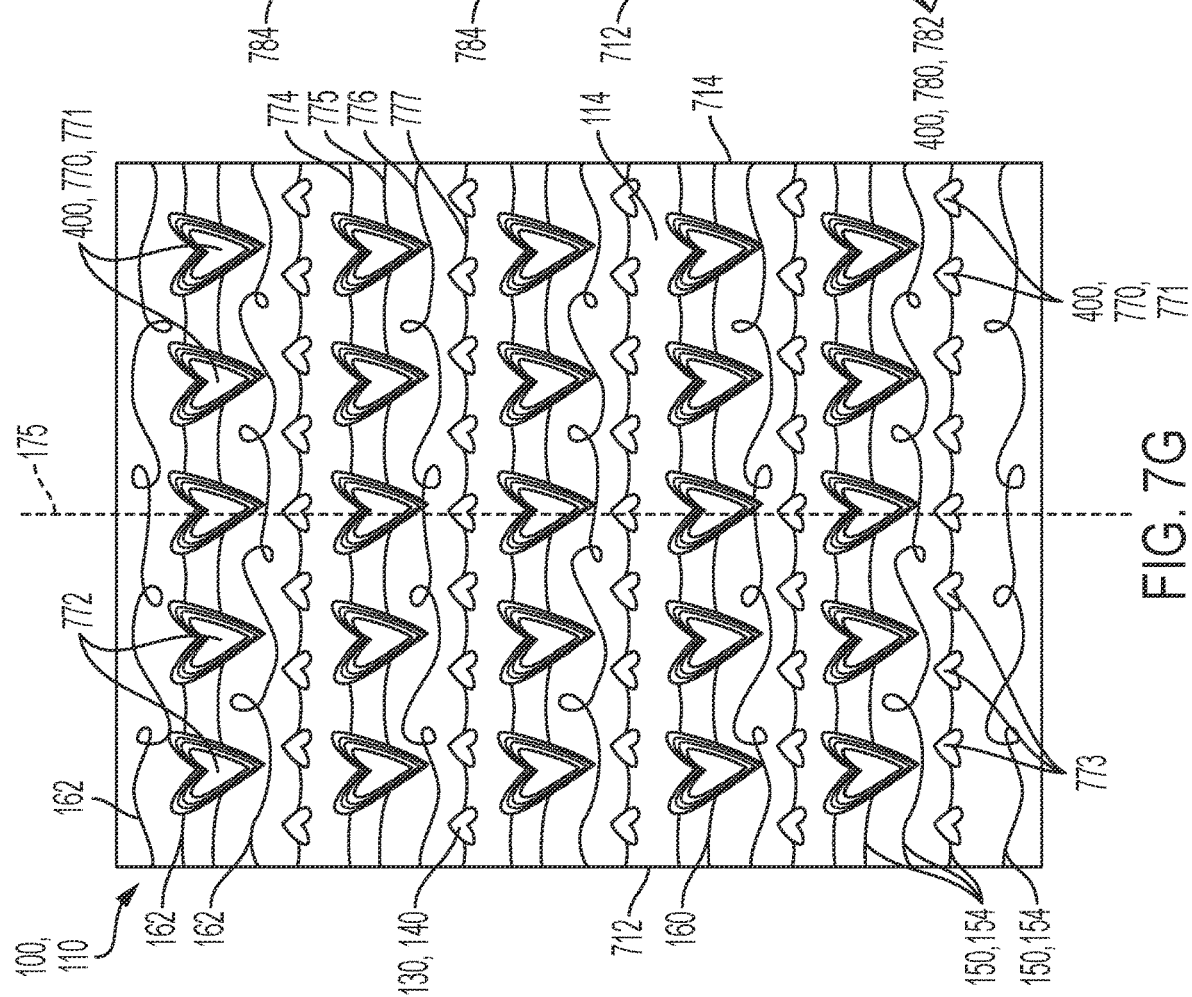

HEIGHT-MEASURING BED SHEET

TECHNICAL FIELD

This disclosure relates to bedding for use in a medical environment. More specifically, this disclosure relates to a bed sheet for measuring the height of a patient.

BACKGROUND

Dosages of medications often are prescribed based on a patient's height. In some circumstances, patients may be not be able to communicate their height to medical professionals. For example, a patient may be unresponsive, or a young patient may not know their height. Furthermore, a patient may not be able to stand up to obtain their height by vertical measurement. It can therefore be desirable to measure the height of a patient while they remain in bed.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a height-measuring bed sheet comprising a top sheet panel defining a height-indicative pattern, the height-indicative pattern comprising height measurement indicia forming a design, wherein the height-measuring bed sheet is configured to cover a mattress of a bed, the top sheet panel is configured to confront a mattress top of the mattress, and the height-indicative pattern forms a height measurement scale for measuring a height of a patient in the bed; a pair of opposing side sheet panels extending from the top sheet panel, the pair of opposing side sheet panels configured to confront opposing mattress sides of the mattress; and a pair of opposing end sheet panels extending from the top sheet panel, the end sheet panels configured to confront opposing mattress ends of the mattress.

Also disclosed is a method of determining a proper medication dosage for a patient, the method comprising covering a mattress of a bed of the patient with a height-measuring bed sheet, the height-measuring bed sheet defining a height-indicative pattern, the height-indicative pattern comprising height measurement indicia forming a design, the height-indicative pattern forming a height measurement scale; visually measuring a height of the patient in the bed with the height measurement scale of the height-measuring bed sheet; and determining a proper medication dosage for the patient as a function of the height of the patient.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 6 is an example chart illustrating ideal body weights for adults based on height.

FIG. 7A is a top view of the height-measuring bed sheet in accordance with another example aspect of the present disclosure.

FIG. 7B is a top view of the height-measuring bed sheet in accordance with another example aspect of the present disclosure.

FIG. 7G is a top view of the height-measuring bed sheet in accordance with another example aspect of the present disclosure.

FIG. 7H is a top view of the height-measuring bed sheet in accordance with another example aspect of the present disclosure.

DETAILED DESCRIPTION

Figure 1:
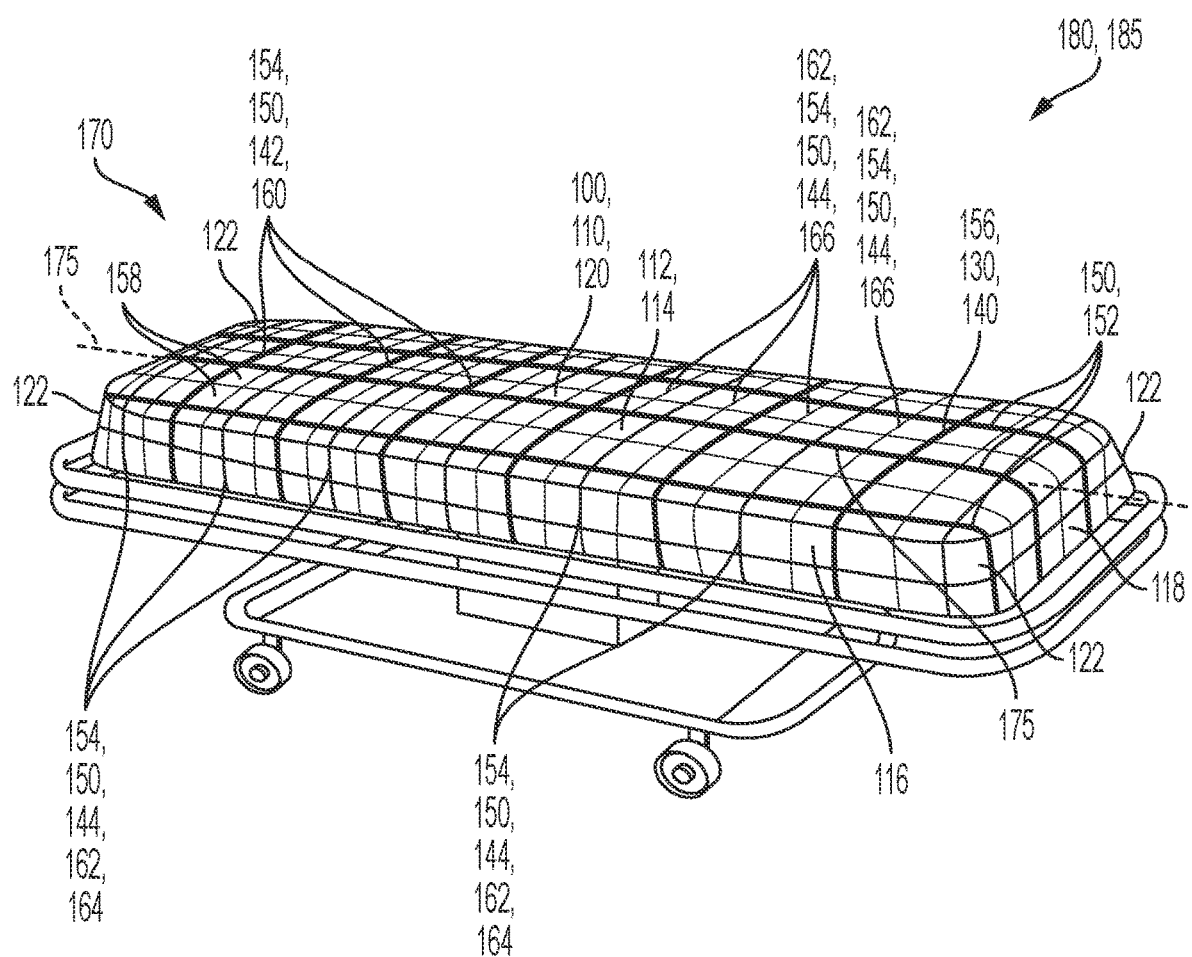
FIG. 1 is a perspective view of a height-measuring bed sheet, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a height-measuring bed sheet and associated methods, systems, devices, and various apparatus. Example aspects of the height-measuring bed sheet can comprise a height-indicative pattern or design thereon. It would be understood by one of skill in the art that the height-measuring bed sheet is described in but a few exemplary embodiments among many. No particular terminology or description should be considered limiting on the disclosure or the scope of any claims issuing therefrom.

FIG. 1 illustrates a side perspective view of a height-measuring cover 100 in accordance with one aspect of the present disclosure. The height-measuring cover 100 can be formed as a height-measuring bed sheet 110 in the present aspect, which can be configured to cover a mattress of a patient's bed 180. In the present aspect, the patient's bed 180 can be a medical bed 185 for use in a hospital, clinic, or other medical facility. In other aspects, the patient's bed 180 can be any other bed for a patient, such as, for example and without limitation, a home-care bed, a rehabilitation facility bed, or the like. In other aspects, the height-measuring bed sheet 110 can be formed as any other suitable height-measuring cover 100, including but not limited to, a blanket or other bedding, a disposable sanitary paper cover, or the like. The height-measuring cover 100 can be configured to cover an examination table or other medical table (e.g., a CT table), a full-body examination or surgical seat or chair (such as an orthodontic chair), or any other support device on which a patient may sit or lay, or the height-measuring cover 100 can cover the patient.

Proper dosages of certain medications can be based on the ideal body weight (IBW) of a patient, which is a function of the patient's height, as opposed to the actual weight (AW) of the patient. An example ideal body weight chart 610 is shown in FIG. 6. It is therefore important for prescribers to be able to quickly and accurately determine the height of the patient, particularly in instances where the patient may be unresponsive or may be unaware of or unable to communicate their height. For example, children, non-verbal patients, confused or delirious patients, and/or patients who are sleeping or unconscious (such as during surgery) may not be able to correctly communicate their height to the prescriber. The prescriber can be, for example and without limitation, a doctor, a nurse, a caretaker, or any other suitable medical caregiver or person in charge of a patient's medication. Additionally, in some cases, proper dosages of certain medications can be based on the patient's adjusted body weight (ABW), the calculation for which is ABW=IBW+ (0.4*(AW in kg—IBW)). As ideal body weight is a function of a patient's height and adjusted body weight is a function of ideal body weight, the patient's adjusted body weight is therefore also a function of the patient's height.

The height-measuring bed sheet 110 can define a height-indicative pattern 130 or design configured to convey the height the patient in the medical bed 185 to the prescriber. According to example aspects, the height-measuring bed sheet 110 can define an outer sheet surface 112 and an inner sheet surface opposite the outer sheet surface 112. The inner sheet surface can face the mattress, while the outer sheet surface 112 can face away from the mattress. Thus, the outer sheet surface 112 of the height-measuring bed sheet 110 can contact the patient lying thereon. In some aspects, the height-indicative pattern 130 can be formed on both the inner sheet surface and the outer sheet surface 112, and in other aspects, the height-indicative pattern 130 can be formed on the outer sheet surface 112 only. In some aspects, wherein the height-indicative pattern 130 can be formed on both the inner sheet surface and the outer sheet surface 112, the height-measuring bed sheet 110 can be selectively reversible, such that the height-measuring bed sheet 110 can also be used with the outer sheet surface 112 facing the mattress and the inner sheet surface facing away from the mattress (i.e., towards the patient).

The height-measuring bed sheet 110 can further define a top sheet panel 114, a pair of opposing side sheet panels 116 extending from the top sheet panel 114, and a pair of opposing end sheet panels 118 extending from the top sheet panel 114. The top sheet panel 114 can confront a mattress top of the mattress, the side sheet panels 116 can confront opposing mattress sides of the mattress, and the end sheet panels 118 can confront opposing mattress ends of the mattress. The patient can be supported on the mattress top of the mattress and thus can lie on the top sheet panel 114 of the height-measuring bed sheet 110. The mattress can define four mattress corners, which can be rounded or angular. In example aspects, the height-measuring bed sheet 110 can be formed as a fitted sheet 120 configured to cinch underneath the mattress at the mattress corners thereof to retain the height-measuring bed sheet 110 tautly thereon. The fitted sheet 120 can define four sheet corners 122 configured to align with the four mattress corners. In other aspects, the height-measuring bed sheet 110 can be formed as a non-fitted sheet and can simply be draped over the mattress top of the mattress. The non-fitted sheet may or may not be tucked underneath the mattress to retain the height-measuring bed sheet 110 thereon. In other aspects, the height-measuring bed sheet 110 can be formed as a top sheet configured to drape over the patient in the medical bed 185.

The height-indicative pattern 130 or design of the height-measuring bed sheet 110 can define varying designs. The height-indicative pattern 130 or design can comprise height measurement indicia 140 configured to indicate various height measurements, which can allow a prescriber to visually measure the height of the patient laying on the height-measuring bed sheet 110. In example aspects, the height-indicative pattern 130 can be configured to allow the patient's height to be measured from the patient's head to the patient's feet in a single easy step. Thus, the measurement can be performed without requiring multiple steps, such as measuring an upper height of the patient's upper body, measuring a lower height of the patient's lower body, and adding the upper and lower heights together to determine the patient's overall height. Additionally, in example aspects, the height-indicative pattern 130 can extend substantially along a length of the top sheet panel 114 between the pair of opposing end sheet panels 118, such that the height of the patient can be measured regardless of where the patient is lying on the height-measuring bed sheet 110. That is, the patient's height can be measured even if the patient is not longitudinally centered on the height-measuring bed sheet 110. For example, the patient may be lying closer to one of the opposed end sheet panels 118.

The height measurement indicia 140 of the height-indicative pattern 130 can comprise measurement lines 150 in the present aspect. As shown, the height-indicative pattern 130 can define a grid pattern 156 having a plurality of substantially longitudinal lines 152 and a plurality of substantially lateral lines 154 intersecting the substantially longitudinal lines 152. The measurement lines 150 can comprise the substantially lateral lines 154, which can be substantially lateral measurement lines 154 configured to indicate various height measurements to allow for measuring the height of the patient, as described in further detail below. Other aspects of the height-indicative pattern 130 may not comprise the substantially longitudinal lines 152 and can comprise the substantially lateral measurement lines 154 only. Furthermore, other aspects of the height-indicative pattern 130 can define any other suitable design that includes height measurement indicia 140. For example and without limitation, various other example aspects of the height-indicative pattern 130 are illustrated in FIGS. 4, 5, and 7A-7H.

Figure 4:
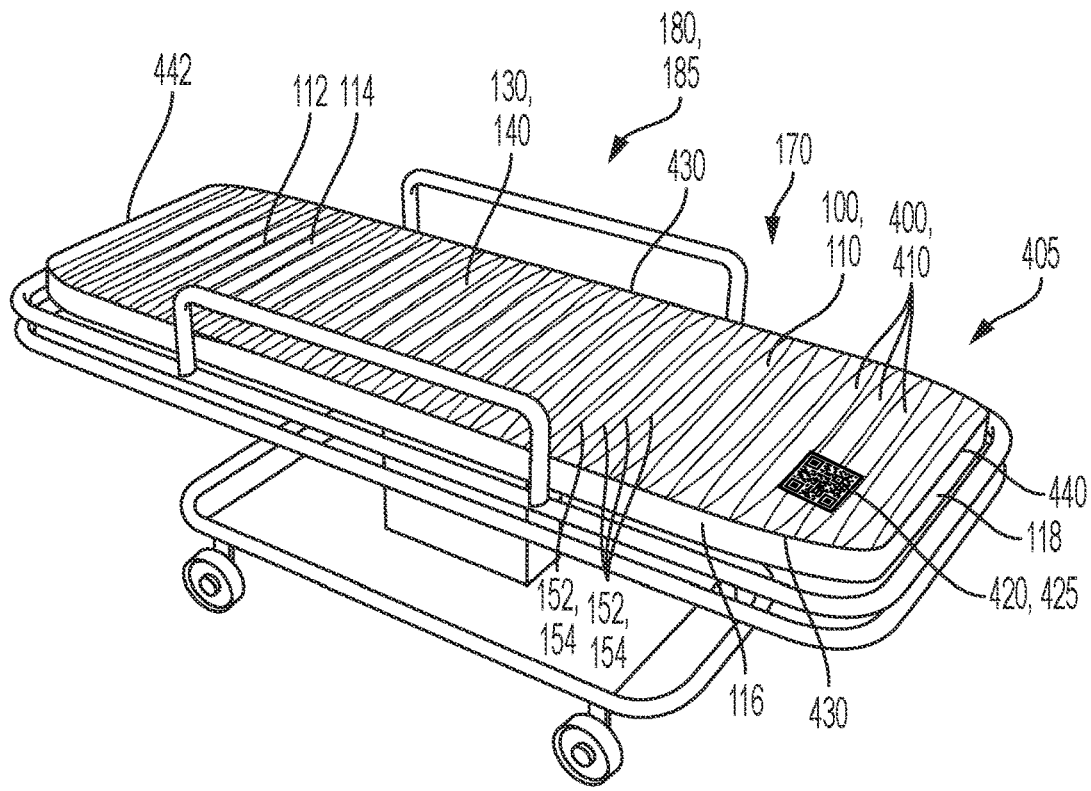
FIG. 4 is a perspective view of the height-measuring bed sheet in accordance with another example aspect of the present disclosure.
Figure 7D:
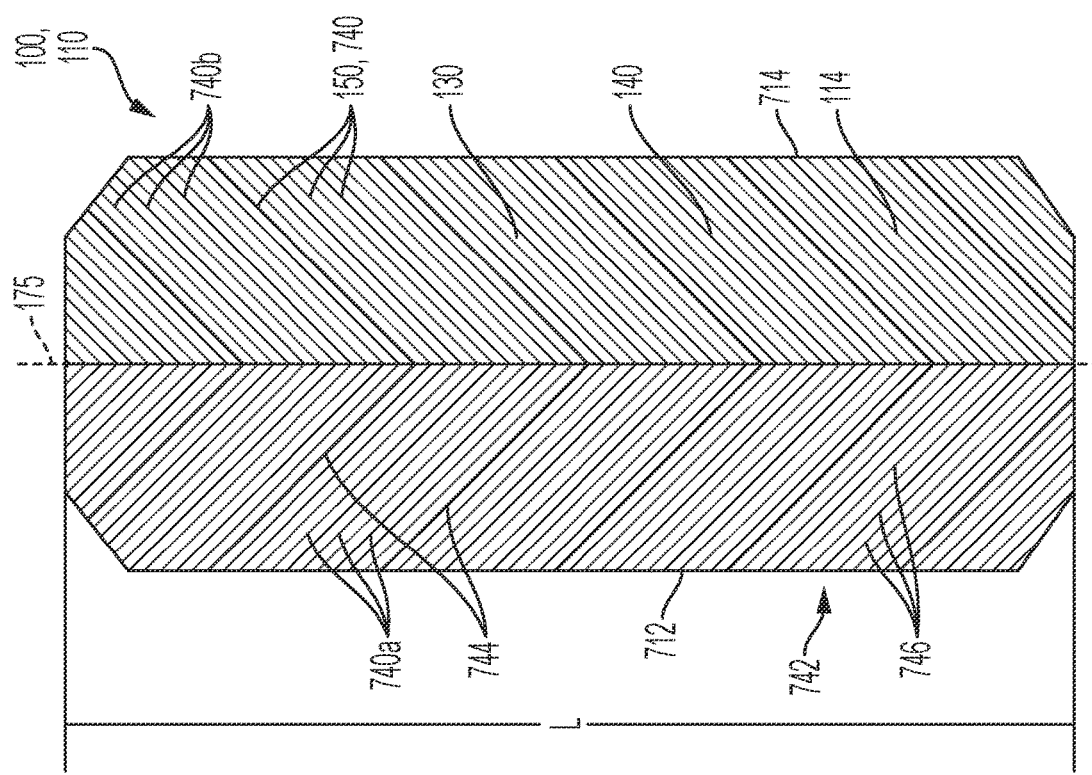
FIG. 7D is a top view of the height-measuring bed sheet in accordance with another example aspect of the present disclosure.

The longitudinal lines 152 and the lateral measurement lines 154 can be substantially linear in the present aspect. In other aspects, the longitudinal lines 152 and/or the lateral measurement lines 154 can be non-linear. For example, some or all of the longitudinal lines 152 and/or the lateral measurement lines 154 can be wavy or loopy (such as the lateral measurement lines 154 shown in FIGS. 7E and 7G), rounded or arcuate (such as the lateral measurement lines 154 shown in FIGS. 4 and 5), or jagged (such as the lateral measurement lines 154 forming a chevron-style height-indicative pattern 760 in FIG. 7F). In other aspects, the measurement lines 150 may not be substantially lateral. For example and without limitation, the measurement lines 150 can be diagonal measurement lines 740, as shown FIG. 7D. In addition to or alternative to the measurement lines 150, the height-indicative pattern 130 can comprise any other suitable height measurement indicia 140 for indicating various measurements, such as various measurement shapes 400 (shown in FIGS. 4, 7E, 7G, and 7H). For example and without limitation, the height measurement indicia 140 can comprise substantially oval-shaped indicia 405 as shown in FIG. 4, substantially circle-shaped measurement indicia 750 as shown in FIG. 7E, heart-shaped measurement indicia 770 as shown in FIG. 7G, flower-shaped measurement indicia 780 as shown in FIG. 7H, or any other suitably shaped height measurement indicia 140.

Furthermore, in the present aspect, each of the lateral measurement lines 154 can extend fully across the top sheet panel 114 of the height-measuring bed sheet 110 between the opposing side sheet panels 116, and each of the longitudinal lines 152 can extend fully across the top sheet panel 114 between the opposing end sheet panels 118. In other aspects, some or all of the longitudinal lines 152, lateral measurement lines 154, and/or other height measurement indicia 140 may extend only partially across the top sheet panel 114 (such as various lateral measurement lines 154 shown in FIGS. 7A-7C). As shown, in addition to the top sheet panel 114, the height-indicative pattern 130 can also be formed on the opposing side sheet panels 116 and/or the opposing end sheet panels 118 of the height-measuring bed sheet 110 in some aspects. However, in other aspects, the height-indicative pattern 130 may not be formed on the opposing side sheet panels 116 and/or the opposing end sheet panels 118. For example, in some aspects, the height-indicative pattern 130 can formed on the top sheet panel 114 only, as shown in FIG. 4.

In example aspects, each of the lateral measurement lines 154 can be equally spaced between adjacent ones of the lateral measurement lines 154. In the present aspect, each of the lateral measurement lines 154 can be spaced from each adjacent lateral measurement line 154 by about 3 inches (¼ foot), as described in further detail below. Thus, each of the lateral measurement lines 154 can function as a hash mark indicating a 3 inch measurement. Even with the lateral measurement lines 154 spaced apart by about 3 inches (or more), a prescriber can reliably measure the patient's height down to about an inch, plus or minus negligible tolerances. In other aspects, each of the lateral measurement lines 154 can be spaced from adjacent lateral measurement lines 154 by more or less than 3 inches. For example and without limitation, in other aspects, each of the lateral measurement lines 154 may be spaced from adjacent lateral measurement lines 154 by about 12 inches (one foot), 6 inches (½ foot), 4 inches (⅓ foot), 2 inches (⅙ foot), or 1 inch (1/12 foot). In some aspects, the height-indicative pattern 130 can comprise additional height measurement indicia 140, such as additional lateral measurement lines 154, that can indicate fractions of an inch.

Additionally, in the present aspect, each of the substantially longitudinal lines 152 can be spaced from each adjacent longitudinal line 152 by about 3 inches, such that the grid pattern 156 can define a plurality of 3 inch×3 inch squares 158, as shown. However, in other aspects, the each of the longitudinal lines 152 can be spaced from adjacent longitudinal lines 152 by more or less than 3 inches. Moreover, in other aspects, the lateral measurement lines 154 may not indicate height measurements in imperial units (e.g., inches/feet), but rather can indicate height measurement in any other suitable units of length, such as metric units (e.g., centimeters/meters), for example and without limitation. In other aspects, the height-indicative pattern 130 can be configured to indicate measurement in multiple units of length, as described in further detail below.

In example aspects, wherein the height measurement indicia 140 indicate height measurement in imperial units (e.g., inches/feet), the height measurement indicia 140 can comprise foot measurement indicia 142 each indicating a 1' measurement and fraction measurement indicia 144 each indicating a fraction of a 1' measurement. In example aspects of the height-indicative pattern 130, the dimensions, colors, saturations/intensities, and/or other visual variables of the lateral measurement lines 154 or other height measurement indicia 140 can vary to further distinguish the particular measurement indicated by the lateral measurement line 154 or height measurement indicia 140. For example, in the present aspect, variations in both thickness and color can further distinguish the measurement indicated by each lateral measurement line 154. As shown, the lateral measurement lines 154 can comprise foot lines 160 each indicating a one-foot (1') measurement and fraction lines 162 each indicating a fraction of one foot, such as, for example, ½ foot, ⅓ foot, ¼ foot, ⅙ foot, 1/12 foot, etc. For example, in the present aspect, thick, dark blue lines can be the foot lines 160 each indicating a one-foot (1') measurement, a medium-thickness, medium-blue line disposed between each adjacent pair of foot lines 160 can be a half-foot fraction line 164 indicating a half-foot (½' or 6") measurement, and a thin, light blue line disposed between each adjacent foot line 160 and half-foot fraction line 164 can be a quarter-foot fraction line 166 indicating a one-quarter foot (¼' or 3") measurement or a three-quarters foot (¾' or 9") measurement. In other aspects, the colors, thicknesses, or any other visual feature of the lateral measurement lines 154 can vary.

According to example aspects, the height-indicative pattern 130 of the height-measuring bed sheet 110 can be a stimulating and/or aesthetically pleasing design, in contrast to the plain bed sheets often found in medical facilities. Thus, in addition to providing a functional height measurement scale 170, the height-measuring bed sheet 110 can be pleasant to look at and can evoke a sense of comfort and hominess to improve the often-sterile atmosphere of medical facilities. Furthermore, as shown, the appearance of the height-measuring bed sheet 110 can be designed such that it may not be obvious to the patient that the height-measuring bed sheet 110 can function as the height measurement scale 170. For example, the height-measuring bed sheet 110 may not comprise any (or can comprise minimal) numbers, words, or other indicia thereon that expose the functional use of the height-measuring bed sheet 110 for height measurement, and the height-measuring bed sheet 110 can rely solely on the aesthetically pleasing height-indicative pattern 130 itself to convey measurement. Furthermore, in example aspects, the height-indicative pattern 130 can be substantially symmetrical about a longitudinal centerline 175 of the top sheet panel 114, unlike standard rulers and other common measurement scales. Moreover, varying colors, dimensions, shapes, and other visual features of the height-indicative pattern 130 can imply to a patient that the height-indicative pattern 130 is purely an aesthetic design, as opposed to a functional design.

Example aspects of the height-measuring bed sheet 110 can be formed from a flexible fabric material, such as cotton, linen, polyester, bamboo, silk, satin, sateen, rayon, nylon, or blends thereof, for example and without limitation. In other aspects, the height-measuring bed sheet 110 can be formed from any other suitable material. The height-indicative pattern 130 can be printed onto the height-measuring bed sheet 110, such as by screen printing, roller printing, block printing, or any other suitable fabric printing technique. In other aspects, the height-indicative pattern 130 can be sewn onto the height-measuring bed sheet 110, such as with colored threads for example and without limitation, sublimated thereon, or applied thereto by any other suitable technique for applying the height-indicative pattern 130 to the fabric of the height-measuring bed sheet 110.

Figure 3:
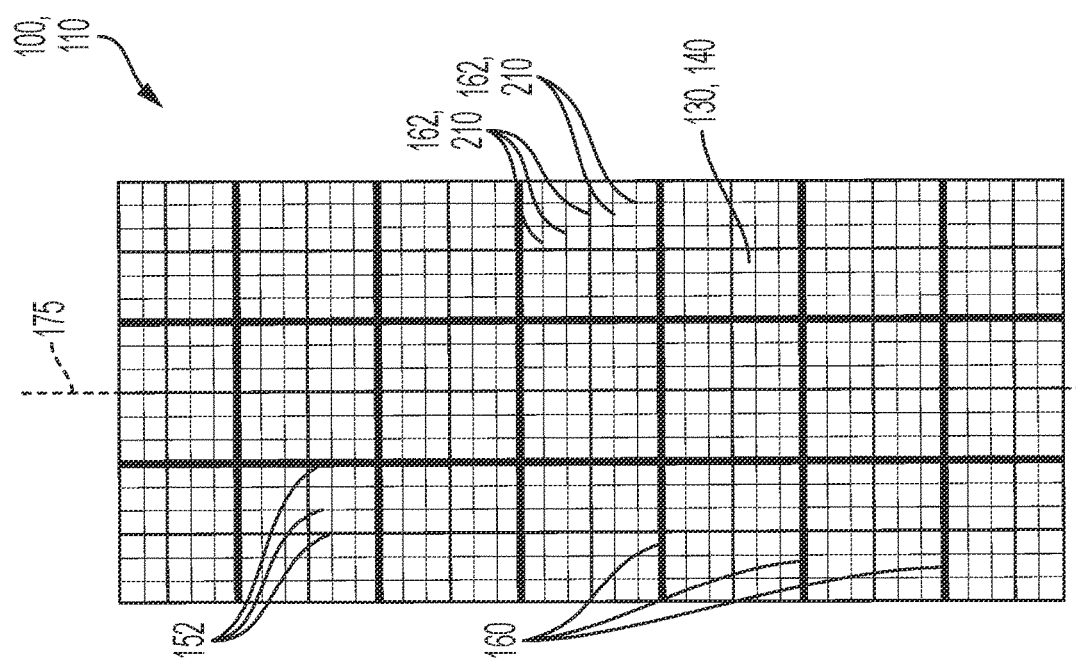
FIG. 3 is a top view of the height-measuring bed sheet of FIG. 1.
Figure 2:
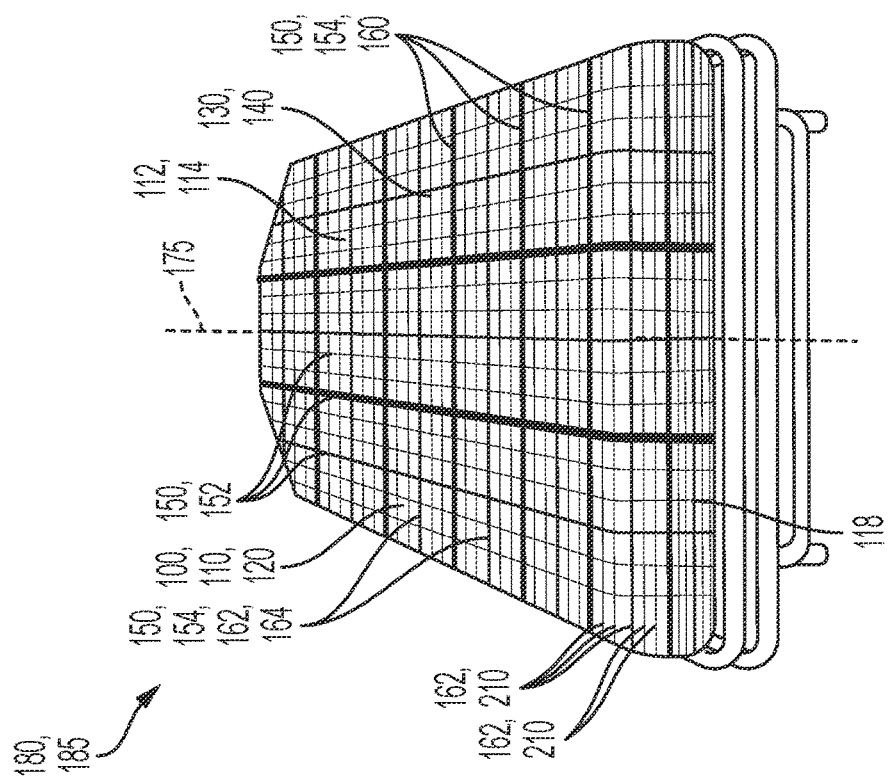
FIG. 2 is another perspective view of the height-measuring bed sheet of FIG. 1.

FIG. 2 illustrates an end perspective view of the height-measuring bed sheet 110 on the patient's bed 180, according to another example aspect of the present disclosure. FIG. 3 illustrates a top perspective view of the height-measuring bed sheet 110 of FIG. 2. In the aspect of FIG. 2 and FIG. 3, the height-measuring bed sheet 110 can be similar to the height-measuring bed sheet 110 of FIG. 1. However, in the present aspect, the fraction lines 162 can be one-sixth foot fraction lines 210 each indicating a 2" measurement.

FIG. 4 illustrates the height-measuring bed sheet 110 in accordance with another aspect of the disclosure. The height-measuring bed sheet 110 can be configured to cover the mattress of the medical bed 185. In the present aspect, the height-indicative pattern 130 comprise the measurement shapes 400, which can include a plurality of oval shapes 410 elongated laterally across the top sheet panel 114. The elongated oval shapes 410 can at least partially define some or all of the substantially lateral measurement lines 154, and the substantially lateral measurement lines 154 can be slightly rounded in the present aspect. In some aspects, the substantially lateral measurement lines 154 and/or the interiors of the oval shapes 410 can vary in color, dimensions, saturation/intensity, and/or other visual variables to distinguish the various measurements indicated by the height-indicative pattern 130 and/or to enhance the aesthetic appearance of the height-indicative pattern 130. In the present aspect, each of the oval shapes 410 can define a height of around about 3 inches to indicate a 3 inch longitudinal measurement. In other aspects, each of the oval shapes 410 can define any other suitable height, such as, for example and without limitation, 1 inch, 2 inches, etc.

Figure 5:
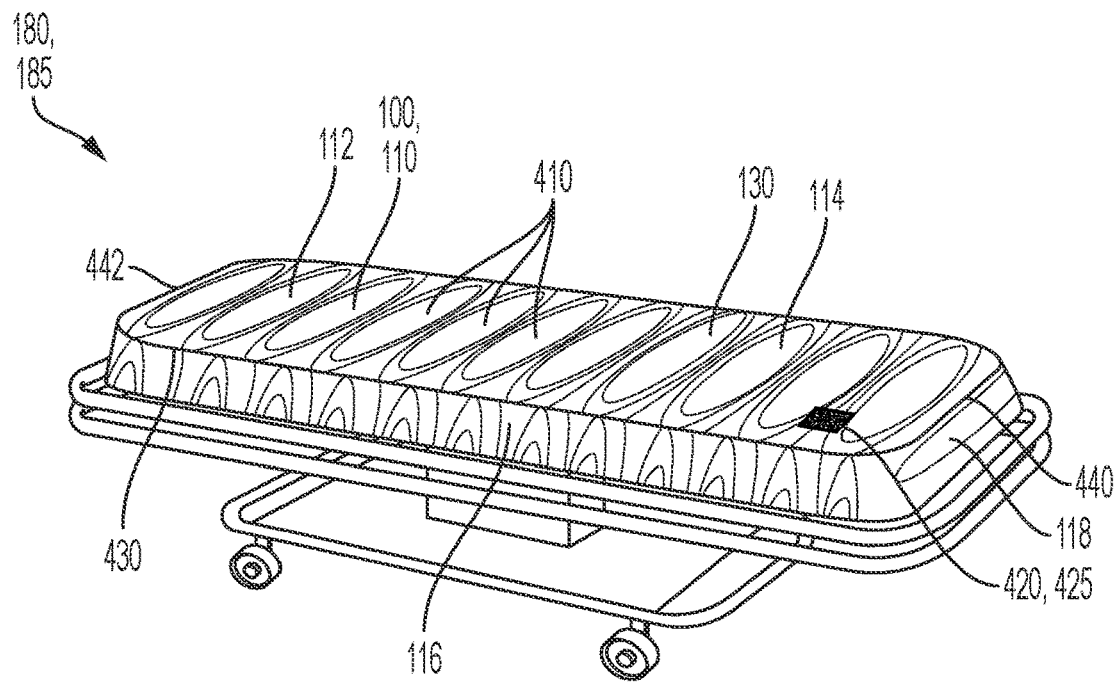
FIG. 5 is a perspective view of the height-measuring bed sheet in accordance with another example aspect of the present disclosure.

In example aspects, the height-indicative pattern 130 can be formed on the top sheet panel 114 only, as shown. In other aspects, as previously described, the height-indicative pattern 130 can further be formed on the opposing side sheet panels 116 and/or the opposing end sheet panels 118. For example, FIG. 5 illustrates the height-measuring bed sheet 110 comprising a height-indicative pattern 130 similar to the height-indicative pattern 130 of FIG. 4, but wherein the height-indicative pattern 130 further extends to both the opposing side sheet panels 116 and the opposing end sheet panels 118. A patient lying on the medical bed 185 may substantially cover the height-indicative pattern 130 on the top sheet panel 114 in some aspects, and the prescriber can refer to the height-indicative pattern 130 formed on either of the side sheet panels 116 to aid in determining the patient's height.

As shown in both FIGS. 4 and 5, in some aspects, the height-measuring bed sheet 110 can comprise a scannable barcode 420, such as a QR code 425, or other machine-readable label configured to link the prescriber to medical information related to the height of a patient. The QR code 425 can be sized and shaped such that it can be read at substantially close range by a phone camera, a tablet camera, a computer camera, or any other suitable camera or scanner device. One skilled in the art will understand that the QR code 425 can be encoded with an URL linking to a webpage with the desired information or a web-based or mobile app. For example and without limitation, the QR code 425 can be configured to link the prescriber to a software application (i.e., an app) containing medical information related to the patient's height. In one example aspects, the medical software application can be a medication calculator application, wherein the prescriber can enter or select the patient's height and/or actual body weight, ideal body weight, or adjusted body weight into the medication calculator app, and the medication calculator app can calculate the appropriate dosage of various medications. In some example aspects, the medical software app can additionally or alternatively include an ideal body weight chart 610 (shown in FIG. 6), an adjusted body weight chart, a dosage chart for various medications as based on height, ideal body weight and/or adjusted body weight, or any other medical information associated with patient height.

In example aspects, the QR code 425 can be located on the top sheet panel 114, as shown. In other aspects, the QR code 425 can be located on either of the opposing side sheet panels 116 or either of the opposing end sheet panels 118. The QR code 425 can be positioned proximate to a periphery 430 of the top sheet panel 114 in the present aspect, to reduce the likelihood that a patient lying on the height-measuring bed sheet 110 is covering the QR code 425. Moreover, in the present aspect, the QR code 425 can be positioned proximate to a foot end 440 of the height-measuring bed sheet 110, opposite a head end 442 of the height-measuring bed sheet 110, to further reduce the likelihood of the patient covering the QR code 425. However, if the patient's feet are covering the QR code 425, they can be easily adjusted to access the QR code 425. In other aspects, the QR code 425 can be positioned at any other location on the height-measuring bed sheet 110 that can be accessed by the prescriber.

Some aspects of the height-measuring bed sheet 110 can comprise more than one QR code 425. For example, in some aspects, the height-measuring bed sheet 110 can comprise multiple QR codes 425 positioned at various locations on the height-measuring bed sheet 110 to allow a prescriber to quickly and easily scan whichever QR code 425 is the closest and/or the most accessible. For example, in one particular aspect, if a first one of the QR codes 425 is covered by a patient lying on the height-measuring bed sheet 110, the prescriber can access a second one of the QR codes 425 not covered by the patient.

In some aspects, each of the multiple QR codes 425 can link to the same information (such as to the same software application (e.g., the medication calculator app) or to identical ideal body weight charts 610). In other aspects, some or all of the multiple QR codes 425 can link to varying information. For example, in a particular example aspect, a first one of the multiple QR codes 425 can link to instructions for how to measure the height of a patient using the height-measuring bed sheet 110 and a second one of the QR codes 425 can link to the medication calculator app. Alternatively, instructions may be printed on or otherwise applied directly to the height-measuring bed sheet 110, or instructions may not be provided at all. In another example aspect, a first one of the multiple QR codes 425 can link to the medication calculator app and a second one of the QR codes 425 can link to a different medical software application. In another example aspect, a first one of the multiple QR codes 425 can link to an ideal body weight chart 610, a second one of the QR codes 425 can link to an adjusted body weight chart, and a third one of the multiple QR codes 425 can link to a dosage chart for common medications based on ideal body weight and/or adjusted body weight. In other aspects, each of the QR codes 425 can link to any other suitable medical information or medical software applications.

The one or more QR codes 425 can be visible on at least the outer sheet surface 112 of the height-measuring bed sheet 110. In some aspects, the one or more QR codes 425 can also be visible on the inner sheet surface. As previously mentioned, in some aspects, the height-measuring bed sheet 110 can be reversible. Like the height-indicative pattern 130, the one or more QR codes 425 can be printed onto the height-measuring bed sheet 110, such as by screen printing, roller printing, block printing, or the like. In other aspects, the QR code 425 can be sewn onto the height-measuring bed sheet 110, sublimated onto the height-measuring bed sheet 110, or applied thereto by any other suitable application technique.

FIG. 6 illustrates the ideal body weight chart 610, in accordance with one example aspect of the present disclosure. As previously described, ideal body weight and adjusted body weight can be functions of a person's height. The example ideal body weight chart 610 shown in FIG. 6 illustrates how ideal body weight can be determined based on height. In example aspects, the QR code 425 (shown in FIG. 4) can link to the medication calculator app, wherein the medication calculator app can calculate proper medication dosages based on a patient's height information entered/selected by a prescriber. As shown, ideal body weight and/or adjusted body weight may differ for male and female patients of the same height. Therefore, in some aspects, a prescriber may also enter or select gender information into the medication calculator app. In other aspects, proper medication dosages may not be gender-based. Additionally, in some aspects, ideal body weight and/or adjusted body weight can differ for adults and children of the same height. Therefore, in some aspects, a prescriber may also enter or select age information into the medication calculator app. For example, in some aspects, the prescriber can enter or select a specific age (e.g., 26 years old) or an age range (e.g., under 18 years old or over 18 years old.) In other aspects, proper medication dosages may not be age-based Proper medication dosages can be calculated in the medication calculator app for a range of heights. For example, in the present aspect, the ideal body weight chart 610 can provide the ideal body weights for males ranging in height from 5'0" to 6'3" in increments of 1" and for females ranging in height from 4'8" to 5'11" in increments of 1". Similarly, the medication calculator app may be configured to calculate proper medication dosages for males ranging in height from 5'0" to 6'3" in increments of 1" and for females ranging in height from 4'8" to 5'11" in increments of 1". In other aspects, the range of heights for males and/or females for which the medication calculator app can calculate proper medication dosages can be larger or smaller. For example and without limitation, a larger height range for males could be provided as about 4'8" to about 7'0", and a larger height range for females could be provided as about 4'5" to about 6'5". Additionally, as shown, the ideal body weight corresponding to each height can be provided in both pounds and kilos in some aspects. Similarly, in some aspects, the medication calculator app may be configured to calculate proper medication dosages based on heights provided in varying length units (e.g., feet & inches and meters & centimeters), and/or the medication calculator app may be configured to calculate proper medication dosages based on ideal body weight and/or adjusted body weighs provided in varying weight units (e.g., pounds and kilos). In some aspects, the medication calculator app may also be configured to provide proper dosages in varying units (e.g., milligrams and ounces).

In other aspects, the ideal body weight corresponding to each height can be provided in more or fewer units of weight measurement, such as, for example and without limitation, in pounds only, in kilos only, or further/alternatively including ounces, grams, stone, or the like. Similarly, in other aspects, the medication calculator app may be configured to receive height entries/selections in multiple units of length or in a single unit of length (e.g., feet & inches) and/or may only be configured to receive weight entries/selections in a multiple units of weight or a single unit of weight (e.g., pounds). The medication calculator app may be configured to provide proper dosages in multiple units or a single unit (e.g., milligrams). Furthermore, in other aspects, the height entered or selected by a prescriber into the medication calculator app may be entered/selected in increments of more or less than 1", such as ½" or 2" increments for example and without limitation. Additionally, while the ideal body weight chart 610 of the present aspect provides numerical information in rows and columns, in other aspects, the ideal body weight chart 610 can provide information in any suitable form, such as a graph (e.g., bar graph, line graph, pictogram, etc.).

In some aspects, instead of or in addition to the one or more QR codes 425, the ideal body weight chart 610 or any other medical information associate with patient height can be provided directly on the height-measuring bed sheet 110 (shown in FIG. 1). For example, in some aspects, the ideal body weight chart 610 could be printed directly onto (or otherwise applied to) the height-measuring bed sheet 110 to facilitate calculating proper medication dosages.

FIGS. 7A-7H illustrate top views of the height-measuring bed sheet 110 comprising various height-indicative patterns 130 or designs, according to additional aspects of the present disclosure. In FIG. 7A, the height-indicative pattern 130 of the height-measuring bed sheet 110 can comprise a plurality of the substantially lateral measurement lines 154. The lateral measurement lines 154 in the present aspect can comprise the foot lines 160 and the fraction lines 162. The foot lines 160 can each indicate a one-foot (1') measurement, and the fraction lines 162 can be the one-sixth foot fraction lines 210 each indicating a 2" measurement (and more specifically, a ⅙, ⅓, ½, ⅔, or ⅚ foot measurement).

In example aspects, each of the foot lines 160 can extend laterally across the top sheet panel 114 substantially from a first panel side 712 of the top sheet panel 114 to an opposite second panel side 714 of the top sheet panel 114. In the present aspect, each of the one-sixth foot fraction lines 210 can extend only partially across the top sheet panel 114 from the first panel side 712 thereof towards the longitudinal centerline 175. Thus, in the present aspect, the height-indicative pattern 130 can be asymmetrical about the longitudinal centerline 175; however, in other aspects, the height-indicative pattern 130 can be symmetrical about the longitudinal centerline 175. In example aspects, the lengths of the foot lines 160 and the one-sixth foot fraction lines 210 can vary or the lengths can be equal. Other visual features of the measurement lines 150, such as color and thickness for example and without limitation, may also vary.

The height-indicative pattern 130 can further define alternating color blocks 716 between adjacent foot lines 160 to further distinguish the one-foot measurements. For example, in one particular aspect, a blue color block 716a can extend between a first foot line 160a and an adjacent second foot line 160b, a yellow color block 716b can extend between the second foot line 160b and an adjacent third foot line 160c, another blue color block 716c can extend between the third foot line 160c and an adjacent fourth foot line 160d, and so on. In other aspects, the height-indicative pattern 130 can comprise additional or alternative colors for the color blocks 716. Moreover, in other aspects, the alternating color blocks 716 can be defined between adjacent one-sixth foot fraction lines 210, between adjacent foot lines 160 and half-foot fraction lines 164 (i.e., the one-sixth foot fraction lines 210 indicating a ½ foot measurement), or can define any other suitable arrangement.

Referring to FIG. 7B, a first set of the substantially lateral measurement lines 154 can extend from the first panel side 712 of the height-measuring bed sheet 110 towards the longitudinal centerline 175 to define a first height measurement scale 170a at the first panel side 712. A second set of the substantially lateral measurement lines 154 can extend from the second panel side 714 of the height-measuring bed sheet 110 towards the longitudinal centerline 175 to define a second height measurement scale 170b at the second panel side 714. In some aspects, each of the first and second height measurement scales 170a,b can measure height in the same units of length, such as in inches/feet or in centimeters/meters. In other aspects, the first and second height measurement scales 170a,b can measure height in different units of length. For example, in a particular aspect, the first height measurement scale 170a can measure height in inches/feet, and the second height measurement scale 170b can measure height in centimeters/meters. Furthermore, in example aspects, different features of the substantially lateral measurement lines 154 can vary to help distinguish the specific measurements indicated by the substantially lateral measurement lines 154 and/or to enhance the aesthetics of the height-indicative pattern 130. For example, in the present aspect, the colors, lengths, and thicknesses of the substantially lateral measurement lines 154 can vary.

Figure 7C:
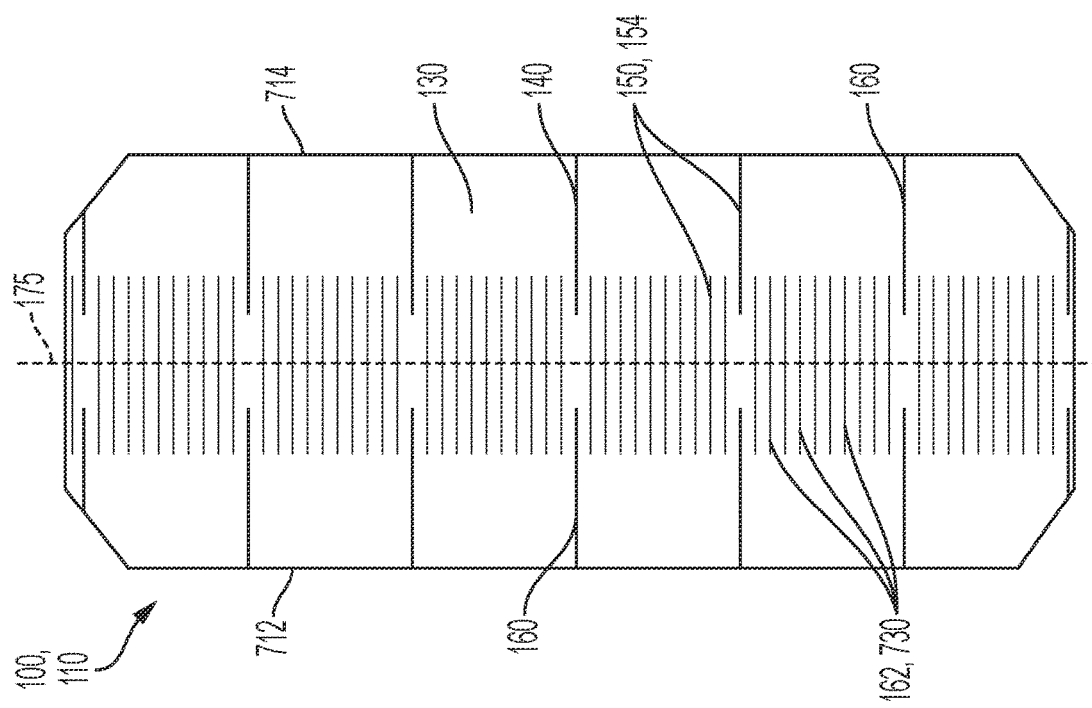
FIG. 7C is a top view of the height-measuring bed sheet in accordance with another example aspect of the present disclosure.

FIG. 7C illustrates another example aspect of the height-measuring bed sheet 110. The height-indicative pattern 130 can define a plurality of the substantially lateral measurement lines 154. In the present aspect, the foot lines 160 can extend inward from both the first panel side 712 and the second panel side 714 towards the longitudinal centerline 175, and the fraction lines 162 (which can be one-twelfth foot fraction lines 730 each representing a 1" measurement in the present aspect) can extend outward from the longitudinal centerline 175 towards both of the first panel side 712 and the second panel side 714. As previously described, colors, dimensions, and/or other features of the substantially lateral measurement lines 154 can vary in some aspects to help distinguish the particular measurement indicated by each of the lateral measurement lines 154 and/or to enhance the aesthetics of the height-indicative pattern 130.

FIG. 7D illustrates another example aspect of the height-measuring bed sheet 110. In the present aspect, the measurement lines 150 of the height measurement indicia 140 can be the substantially diagonal measurement lines 740. As shown, a first set 740a of the diagonal measurement lines 740 can extend from the first panel side 712 to the longitudinal centerline 175 of the top sheet panel 114, and a second set 740b of the diagonal measurement lines 740 can extend from the second panel side 714 to the longitudinal centerline 175. In example aspects, the height-indicative pattern 130 can be symmetrical about the longitudinal centerline 175 to define a repeating V-pattern 742 along a length L of the height-measuring bed sheet 110, as shown. In some aspects, colors, dimensions, and/or other features of the diagonal measurement lines 740 can vary to help distinguish the particular measurement indicated by each of the diagonal measurement lines 740 and/or to enhance the aesthetics of the height-indicative pattern 130. For example, in the present aspect, diagonal foot lines 744 of the diagonal measurement lines 740 can define a greater thickness than diagonal fraction lines 746 of the diagonal measurement lines 740.

FIG. 7E illustrates another example aspect of the height-measuring bed sheet 110. As shown, the height-indicative pattern 130 can define a plurality of the substantially lateral measurement lines 154, which can be slightly wavy or otherwise non-linear in the present aspect. In other aspects, the measurement lines 154 can be substantially linear. The colors, dimensions, and/or other features of the substantially lateral measurement lines 154 may vary to help distinguish the particular measurement indicated by each of the lateral measurement lines 154 and/or to enhance the aesthetics of the height-indicative pattern 130. For example, in the present aspect, the foot lines 160 can be darker in color and/or thicker than the fraction lines 162 to distinguish the foot lines 160 over the fraction lines 162. The fraction lines 162 can be the one-twelfth foot fraction lines 730 each representing a 1" measurement in the present aspect.

Moreover, as shown, the height-indicative pattern 130 can comprise additional height measurement indicia 140. Specifically, the additional height measurement indicia 140 can comprise the circle-shaped measurement indicia 750, and the measurement shapes 400 can comprise measurement circles 752. The measurement circles 752 can be fraction circles 754 in the present aspect. For example, a pair of half-foot fraction circles 756 each indicating a 6" measurement can be disposed in series between each adjacent pair of foot lines 160. Additionally, six one-sixth foot fraction circles 758 each indicating a 2" measurement can be disposed in series between each adjacent pair of foot lines 160. That is, each of the half-foot fraction circles 756 can define a 6" diameter, and each of the one-sixth foot fraction circles 758 can define a 2" diameter. In some aspects, the color of the one-sixth foot fraction circles 758 can differ from the color of the half-foot fraction circles 756 to further distinguish the one-sixth foot fraction circles 758 over the half-foot fraction circles 756. Various other visual features of the one-sixth foot fraction circles 758, the half-foot fraction circles 756, and/or the measurement lines 150 can differ in other aspects. In other aspects, the height measurement indicia 140 can also or alternatively define any other suitable shapes and/or size.

Figure 7F:
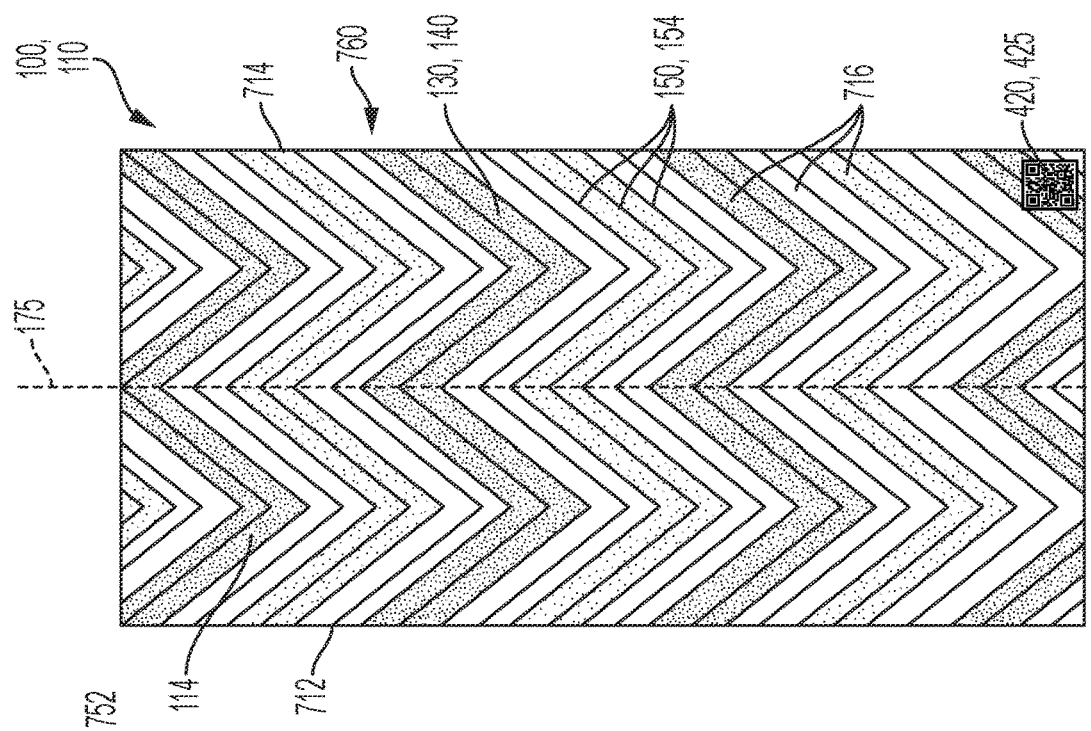
FIG. 7F is a top view of the height-measuring bed sheet in accordance with another example aspect of the present disclosure.
Figure 7E:
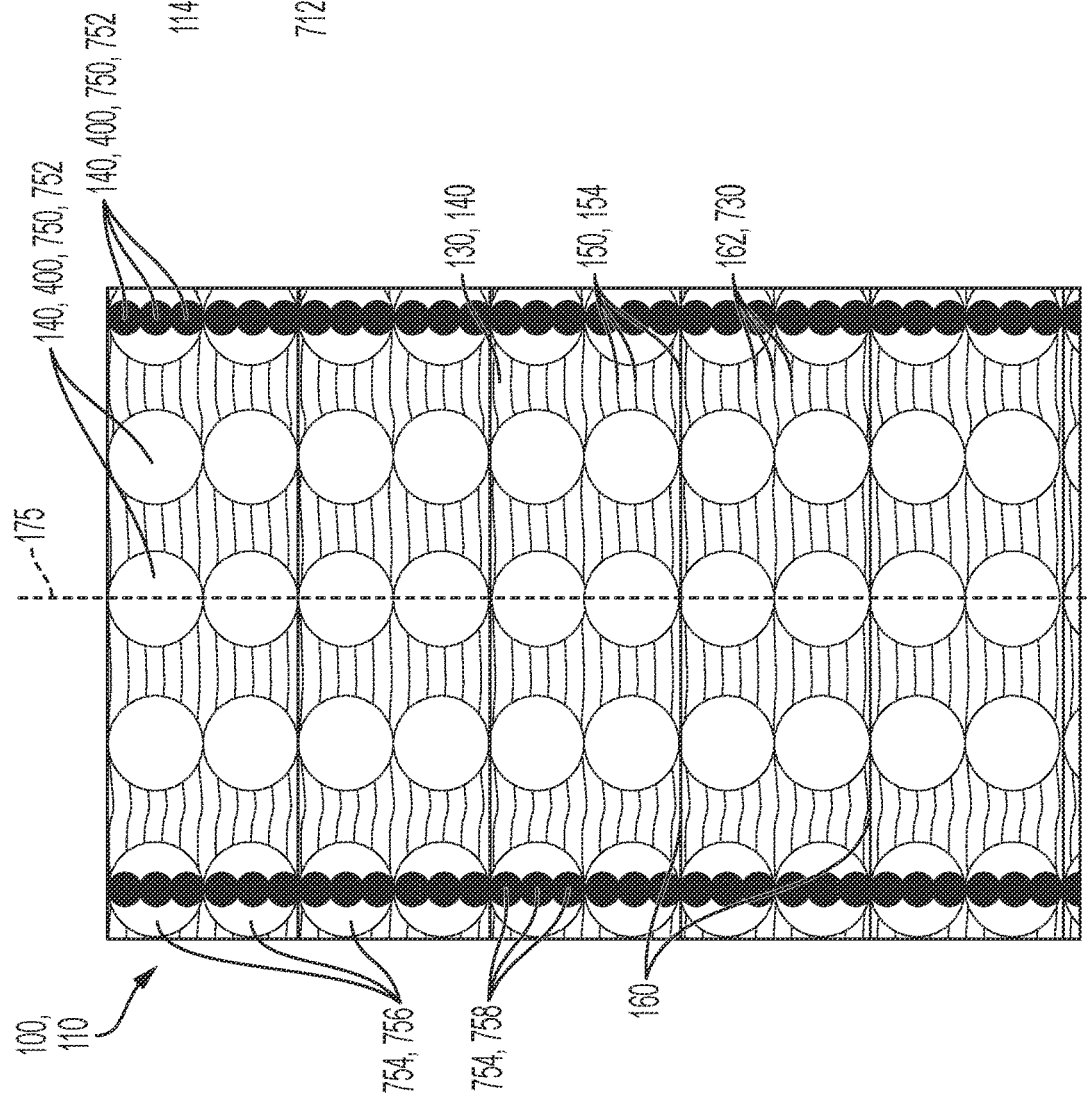
FIG. 7E is a top view of the height-measuring bed sheet in accordance with another example aspect of the present disclosure.

FIG. 7F illustrates a top view of the height-measuring bed sheet 110 in accordance with another aspect of the present disclosure. The measurement lines 150 of the height measurement indicia 140 can extend substantially laterally across the top sheet panel 114 from the first panel side 712 to the second panel side 714, but the lateral measurement lines 154 can be jagged in the present aspect to define the chevron-style height-indicative pattern 760. The measurement lines 150 can vary in thickness and color in the present aspect to distinguish the measurement lines 150 from one another and to enhance the aesthetic appearance of the height-measuring bed sheet 110. Additionally, in some aspects, the height-indicative pattern 130 can comprise the chevron-shaped color blocks 716 between the measurement lines 150, which can vary in color. In other aspects, alternative or additional visual features of the height-indicative pattern 130 can vary.

FIG. 7G illustrates another example aspect of the height-measuring bed sheet 110. The height-indicative pattern 130 can define a plurality of the substantially lateral measurement lines 154, which can include substantially linear measurement lines 774, wavy measurement lines 775, loopy measurement lines 776, and string-of-hearts measurement lines 777 in the present aspect. The colors, various dimensions, and/or other features of the substantially lateral measurement lines 154 may vary to further help distinguish the particular measurement indicated by each of the lateral measurement lines 154 and/or to enhance the aesthetics of the height-indicative pattern 130. For example, in the present aspect, the measurement lines 150 can vary in color. Additionally, in the present aspect, the wavy measurement lines 775 can be the foot lines 160, and the substantially linear, loopy, and string-of-hearts measurement lines 774, 776,777 can be the fraction lines 162. Each of the loopy, string-of-hearts, and substantially linear measurement lines 776,777,774 can generally indicate a ¼ foot measurement, a ½ foot measurement, and a ¾ foot measurement, respectively.

The height-indicative pattern 130 can also comprise additional height measurement indicia 140 in the present aspect. Specifically, the additional height measurement indicia 140 can be the heart-shaped measurement indicia 770, and the measurement shapes 400 can include measurement hearts 771. For example, a plurality of large-sized foot hearts 772 can be spaced laterally along each of the wavy measurement lines 775 (i.e., the foot lines 160 each indicating a 1' measurement) to aid in identifying the foot lines 160. Additionally, a plurality of small-sized fraction hearts 773 can be spaced laterally along each of the string-of-hearts measurement lines 777 (i.e., the half-foot fraction lines 164 each indicating a 6" measurement) disposed centrally between adjacent foot lines 160 to aid in identifying the half-foot fraction lines 164. In some aspects, the color and/or the thickness of the small-sized fraction hearts 773 can differ from the color and/or the thickness of the large-sized foot hearts 772. Various other visual features of the fraction hearts 773 and the foot hearts 772 can differ in other aspects. In other aspects, the height measurement indicia 140 can also or alternatively define any other suitable shapes.

FIG. 7H illustrates another example aspect of the height-measuring bed sheet 110. As shown, in some aspects, the height-indicative pattern 130 may not define any of the measurement lines 150 (shown in FIG. 1) and can instead comprise other height measurement indicia 140 of any suitable shape. For example, in the present aspect, the height measurement indicia 140 can be the flower-shaped measurement indicia 780, and the measurement shapes 400 can comprise measurement flowers 782. The measurement flowers 782 can comprises color-filled measurement flowers 784 and unfilled measurement flowers 786 in the present aspect. For example, a plurality of rows of the color-filled measurement flowers 784 can extend laterally across the top sheet panel 114 from the first panel side 712 to the second panel side 714. Additionally, a row of the unfilled measurement flowers 786 can extend laterally across the top sheet panel 114 from the first panel side 712 to the second panel side 714 between each adjacent row of color-filled measurement flowers 784. In example aspects, each row of color-filled or unfilled measurement flowers 784,786 can define a height H of about one foot (1') to indicate a 1' measurement. In other aspects, each row of color-filled or unfilled measurement flowers 784,786 can define a height H of about 6 inches (6") to indicate a 6" measurement, or any other suitable height H indicating a corresponding measurement.

In some aspects, the measurement flowers 782 in each row of color-filled measurement flowers 784 can be filled with a color that is different than the measurement flowers 782 in the other rows of color-filled measurement flowers 784. In some aspects, the measurement flowers 782 in each row of unfilled measurement flowers 786 can be outlined in a color that is different than the measurement flowers 782 in the other rows of unfilled measurement flowers 786. In other aspects, all of the measurement flowers 782 can be color-filled measurement flowers 784 or all of the measurement flowers 782 can be unfilled measurement flowers 786. In other aspects, other visual features of the measurement flowers 782 can vary to help further distinguish the specific measurements indicated by the measurement flowers 782 and/or to enhance the aesthetics of the height-indicative pattern 130.

Any feature described herein such as, for example and without limitation, the height measurement indicia 140, and other components of the height-measuring bed sheet 110 and their arrangement, can comprise both functional and aesthetic elements, and any feature described as having functional aspects can have or define any one of several aesthetic designs without altering the respective parts' functions. If aesthetic elements are shown in the drawings or possibly fall within the scope of broader claim elements without being directly claimed, such disclosure or claims should not be interpreted as assigning any function to such aesthetic elements which may therefore be separately protectable.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A height-measuring bed sheet comprising:
    a top sheet panel defining a height-indicative pattern, the height-indicative pattern comprising height measurement indicia forming a design, wherein the height-measuring bed sheet is configured to cover a mattress of a bed, the top sheet panel is configured to confront a mattress top of the mattress, and the height-indicative pattern forms a height measurement scale for measuring a height of a patient in the bed;
    a pair of opposing side sheet panels extending from the top sheet panel, the pair of opposing side sheet panels configured to confront opposing mattress sides of the mattress; and
    a pair of opposing end sheet panels extending from the top sheet panel, the end sheet panels configured to confront opposing mattress ends of the mattress.

2. The height-measuring bed sheet of claim 1, wherein the height-indicative pattern is further formed on the pair of opposing side sheet panels.

3. The height-measuring bed sheet of claim 1, wherein the height measurement indicia comprises at least one of measurement lines and measurement shapes, each of the measurement lines and the measurement shapes indicating a particular measurement.

4. The height-measuring bed sheet of claim 3, wherein the height measurement indicia comprises the measurement lines, and wherein the measurement lines are substantially lateral measurement lines.

5. The height-measurement bed sheet of claim 3, wherein the height measurement indicia comprises foot measurement indicia each indicating a 1' measurement and fraction measurement indicia each indicating a fraction of a 1' measurement.

6. The height-measurement bed sheet of claim 3, wherein at least one visual feature of the height measurement indicia varies to differentiate the particular measurements indicated by the height measurement indicia.

7. The height-measurement bed sheet of claim 6, wherein the at least one visual feature is one of color, dimension, and saturation.

8. The height-measuring bed sheet of claim 1, further comprising a scannable barcode linking to medical information related to the height of the patient.

9. The height-measuring bed sheet of claim 8, wherein the medical information linked by the scannable barcode is related to proper medication dosages as a function of the height of the patient.

10. The height-measuring bed sheet of claim 9, wherein the scannable barcode links to a software application configured to calculate proper medication dosages as a function of the height of the patient.

11. The height-measuring bed sheet of claim 8, wherein the scannable barcode is a QR code.

12. The height-measuring bed sheet of claim 8, wherein:
    the top sheet panel defines a periphery;
    the pair of opposing side sheet panels and the pair of opposing end sheet panels extend from the periphery of the top sheet panel; and the scannable barcode is disposed proximate to the periphery of the top sheet panel.

13. The height-measuring bed sheet of claim 12, wherein:
the height-measuring bed sheet defines a foot end and a head end opposite the foot end;
a first end sheet panel of the pair of opposing end sheet panels extends from the periphery of the top sheet panel at the head end;
a second end sheet panel of the pair of opposing end sheet panels extends from the periphery of the top sheet panel at the foot end; and
the scannable barcode is disposed proximate to the foot end of the height-measuring bed sheet.

14. The height-measuring bed sheet of claim 1, wherein the height-indicative pattern is substantially symmetrical about a longitudinal centerline of the top sheet panel.

15. The height-measuring bed sheet of claim 1, wherein the height-indicative pattern is asymmetrical about a longitudinal centerline of the top sheet panel.

16. The height-measuring bed sheet of claim 1, wherein the height-measuring bed sheet is a fitted sheet configured to cinch underneath the mattress at mattress corners of the mattress.

17. A method of determining a proper medication dosage for a patient comprising:
covering a mattress of a bed of the patient with a height-measuring bed sheet, the height-measuring bed sheet defining a height-indicative pattern, the height-indicative pattern comprising height measurement indicia forming a design, the height-indicative pattern forming a height measurement scale; and
visually measuring a height of the patient in the bed with the height measurement scale of the height-measuring bed sheet.

18. The method of claim 17, further comprising determining a proper medication dosage for the patient as a function of the height of the patient.

19. The method of claim 18, wherein determining a proper medication dosage for the patient as a function of the height of the patient comprises scanning a scannable barcode that links to medical information for proper medication dosages as a function of height.

20. The method of claim 19, wherein:
the scannable barcode links to a software application configured to calculate proper medication dosages as a function of the height of the patient; and
determining a proper medication dosage for the patient as a function of the height of the patient further comprises entering the height of the patient into the software application.

21. The method of claim 19, wherein:
the height-measuring bed sheet comprises a top sheet panel, a pair of opposing side sheet panels, and a pair of opposing end sheet panels;
the top sheet panel defines a periphery;
the pair of opposing side sheet panels and the pair of opposing end sheet panels extend from the periphery of the top sheet panel; and
the scannable barcode is disposed proximate to the periphery of the top sheet panel.

* * * * *